Figure 1:
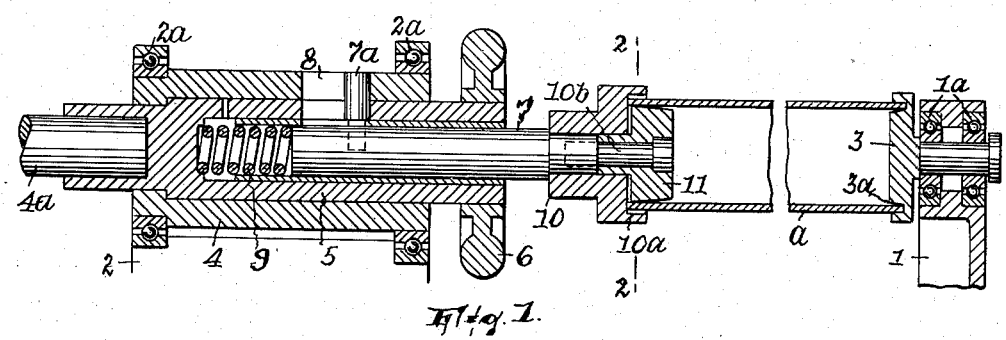

Nov. 28, 1944.  G. W. LANE  2,363,678

MACHINE FOR WINDING FABRICS

Filed Sept. 11, 1942

INVENTOR,
George W. Lane,
BY
ATTORNEY.

Patented Nov. 28, 1944

2,363,678

UNITED STATES PATENT OFFICE 2,363,678

MACHINE FOR WINDING FABRICS

George W. Lane, Clifton, N. J., assignor to Van Vlaanderen Machine Co., Paterson, N. J., a corporation of New Jersey Application September 11, 1942, Serial No. 457,985

1 Claim. (Cl. 242—68)

This invention relates to machines for winding fabric and, given supporting structure, an idle chuck journaled therein and a flexible tubular core, the principal object of the invention is to provide the machine with means, including a spring-urged active chuck, which will be coactive with the idle chuck to exert pressure on the core lengthwise thereof, whereby the core may be removable from and itself replaced in the machine or substituted by a similar core in operative state, and which means, when the core is so positioned, will be adapted by its said active chuck so to distort the core as effectively to rotate the same for causing the winding when said means is itself rotated.

Figure 2:
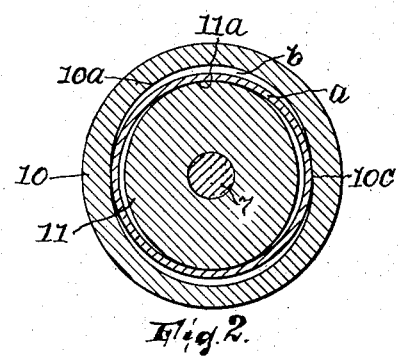

In the drawing,

Fig. 1 shows the principal parts mainly in section in a vertical plane coincident with the axis of winding; and Fig. 2 is a section on line 2—2 of Fig. 1.

At 1 and 2 are shown portions of the supporting structure of the machine.

In the portion 1 is journaled in ball-bearings, as 1a, the idle chuck 3 having a concentric groove 3a in its left-hand face.

In the portion 2 is arranged the aforesaid means including the active chuck and comprising the following parts: In the ball-bearings 2a of the portion 2 is journaled, coaxial with the idle chuck, an element here comprising two telescopically related sleeves 4 and 5, sleeve 5 having an axial bore open toward the idle chuck and sleeve 5 having an axial shaft 4a by which said element is to be driven by means (not shown) of the slip-friction type permitting manual rotation of said element by a hand-wheel 6 affixed to the sleeve 4 of said element when said means is at rest. In the bore of sleeve 5 is a spindle 7 splined to said element, to wit, by having a stud 7a engaged in a longitudinal slot 8 of said element. Between the closed end of the bore and the adjoining end of the spindle is a spring 9 normally urging the spindle to the right in Fig. 1. Fast to the right-hand end of the spindle are a socket member 10, having a socket proper 10a, and an axial fixed headed stud 10b. Free to turn in the socket on the stud is a tapered plug 11. The socket member formed by the spindle and socket is here treated as the driving member and the plug as the driven member of what I term the active chuck. They are both elliptical in cross-section and of such dimensions that each may rotate completely independently of the other in the absence of some intermediary in the slot b (Fig. 2) existing between them, as the end of the core a onto which the fabric is to be wound, such core being here cylindrical and formed of some somewhat flexible material, as pasteboard.

To incorporate the core in operative relation to the two chucks, the active chuck being at rest, one end of the core, tilted, is entered to the slot b, being somewhat distorted from its normally cylindrical form as shown in Fig. 2 by the cross-sectionally elliptical and longitudinally tapered plug member 11, and by means of the core the system of parts 11 and 7—10—10b is displaced to the left in Fig. 1 against the tension of the spring until the other end of the core can be alined with the idle chuck and thereupon entered to its groove 3a.

The core being assembled with the two chucks, and it being assumed that the fabric is initially sufficiently tightly wound thereon to start the winding when the core is rotated and that the fabric is subject to some tension and so resists rotation of the core, rotation of the socket member will cause what are in effect its humps 10c to coact with the humps or lobes 11a of the plug member to clamp the core end between them, whereby to effect rotation of the core.

Having thus fully described my invention, what I claim is:

In a machine of the class set forth, the combination of supporting structure, an idle chuck revoluble therein, an element to be rotated coaxial with said chuck and rotative in said structure, said chuck and element being confined by said structure against axial displacement from each other, an active chuck including a driving member splined to said element and a driven member coaxial with and rotative relatively to the driving member, a flexible normally tubular core interposed between the idle chuck and said driven member, and a spring supported by said element and urging the active chuck toward the idle chuck, the driving member having a radially projecting hump opposed to a circumferential surface of the adjoining end of the core and the driven member having a part thereof in telescoped relation to said core end and tapered lengthwise thereof and holding said core end distorted from its normally circular form and with a portion thereof within the range of rotation of the hump.

GEORGE W. LANE.